United States Patent [19]

Muramatsu et al.

[11] Patent Number: 4,472,038
[45] Date of Patent: Sep. 18, 1984

[54] PHOTOGRAPHIC CAMERA

[75] Inventors: Katsuji Muramatsu; Jiro Sekine; Hiroshi Komatsuzaki; Hiroshi Hara; Nobuyuki Kameyama, all of Tokyo, Japan

[73] Assignee: Fuji Photo Film Co., Ltd., Kanagawa, Japan

[21] Appl. No.: 333,922

[22] Filed: Dec. 23, 1981

[30] Foreign Application Priority Data

Dec. 26, 1980 [JP] Japan .................... 55-186577

[51] Int. Cl.³ ............................................. G03B 17/22
[52] U.S. Cl. .................................................... 354/211
[58] Field of Search ............... 354/211, 288, 203, 212; 242/71.4, 71.5

[56] References Cited

U.S. PATENT DOCUMENTS 1,454,045  5/1923  Dodge ................................. 354/211
2,225,433  12/1940  Goldberg ........................... 354/211

FOREIGN PATENT DOCUMENTS 143549  11/1980  Japan ................................. 354/211

*Primary Examiner*—John Gonzales
*Attorney, Agent, or Firm*—Pasquale A. Razzano

[57] ABSTRACT

A camera adapted to be loaded with a 35 mm film cassette having a cylindrical body and a tongue portion for defining a film exit slit through which the leader of the film projects, the tongue portion extending substantially tangentially from the side wall of the body. The camera has an openable backlid member and a film chamber member defining a cassette receiving chamber. The cassette receiving chamber is exposed when the backlid member is opened, and comprises a cylindrical portion and a slot portion which substantially conform with the cylindrical body and the tongue portion in shape. Thus the cassette receiving chamber determines the position and orientation of the film cassette when it is inserted thereinto and holds it in place. A guide member extends from the film chamber member to define between the inner surface of the backlid member and itself a film guiding slit aligned with said slot and extending beyond the film aperture of the camera body. The guide member has an inclined surface inclining downward toward the backlid member. When the cassette is inserted into the cassette receiving chamber, the lower edge of the leader abuts against the inclined surface to be stretched and smoothly introduced into the film guiding slit. A film cutter is disposed in the film guiding slit between the film aperture and the film take-up chamber and cuts the leader in response to the closure of the backlid member in case that the leader is so long as to extend beyond the cutter.

5 Claims, 5 Drawing Figures

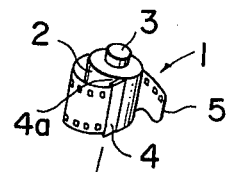
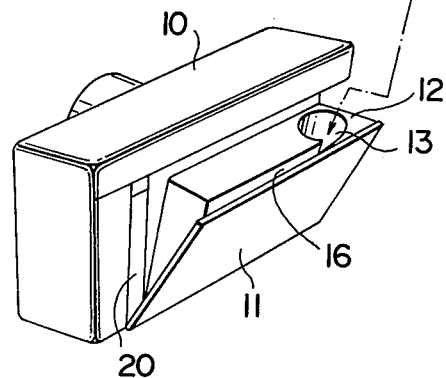
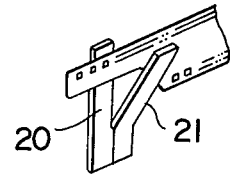
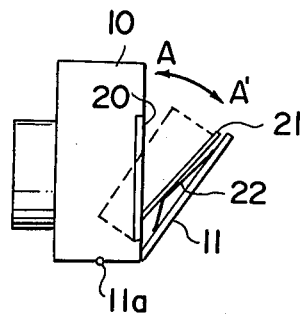
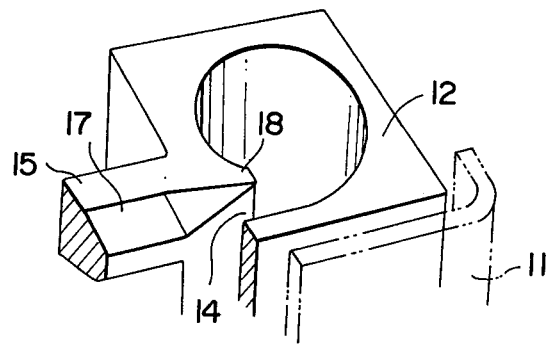

PHOTOGRAPHIC CAMERA

BACKGROUND OF THE INVENTION

1. Field of the Invention

This invention relates to a photographic camera, and more particularly to a 35 mm camera for use with a 35 mm film cassette having a cylindrical cassette body.

2. Description of the Prior Art

The 35 mm film cassettes most widely used at present generally comprise a hollow cylindrical cassette body having an integral tongue portion extending tangentially from the side surface thereof. A film spool is mounted for free rotation along the longitudinal axis of the cassette body and the film is wound therearound. An exit slit is formed in the tongue portion and the film leader is projected outside the body through the exit slit.

When loading a conventional camera with such a film cassette, the backlid of the camera is first opened widely and the cassette is inserted into the film chamber with its upper and lower ends correctly positioned therein so that the film spool engages with the rewind cam projecting into the chamber. Then the film is drawn out from the cassette body across the film aperture and the tip of the film leader is inserted into a slit in the film take-up spool while the perforations of the film are brought into engagement with the transport sprockets. Thereafter, the film wind-up lever and the shutter release button are carefully operated to correctly wind the film around the take-up spool. When it is confirmed that the film is correctly wound, then the backlid is closed. This conventional film loading operation is rather troublesome and requires a certain amount of skill. Accordingly the film loading operation is rather difficult especially for the aged, women or children.

There have been proposed various types of cameras improved to make the film loading operation easier. However, even in these improved cameras, the film loading operation cannot be accomplished by simply inserting the film cassette into the film chamber. In other words, other operations are still required in addition to insertion of the film cassette. For example, in a certain type of improved camera it is necessary to draw out the film from the cassette body and to position the film leader near a film take-up chamber. In another type the film must be pressed down until the backlid is closed to keep it from curling up as is its natural tendency. In still another type having a specially designed film take-up chamber, it is necessary to insert the film leader into a slit formed in the film take-up chamber.

There also have been known 110 cartridges and 126 cartridges having a film feeding chamber and a film take-up chamber formed integrally. These cartridges can be easily loaded into a 110 camera or a 126 camera. However 110 cameras and 126 cameras are not in wide use. Further, the 35 mm film cassette and the 110 or 126 cartridge differ from each other in their systems. Therefore, the concept of the 110 or 126 cartridge cannot be applied to the 35 mm cassette.

In our Japanese Patent Application No. 55(1980)-186574, we have proposed a 35 mm camera which can be easily loaded with a conventional 35 mm film cassette by simple insertion of the cassette, without need to touch or manipulate the film leader thereof. The camera has an openable backlid member and a film chamber member defining a cassette receiving chamber. The cassette receiving chamber is exposed when the backlid member is opened and comprises a cylindrical portion and a slot portion which substantially conform with the cylindrical body and the tongue portion in shape. Thus the cassette receiving chamber determines the position of the film cassette when it is inserted thereinto and holds the film cassette in place. A guide member extends from the film chamber member to define between the inner surface of the backlid member and itself a film guiding slit aligned with said slot and extending beyond the film aperture of the camera body. The guide member has an inclined surface inclining downward toward the backlid member. When the cassette is inserted into the cassette receiving chamber, the lower edge of the leader abuts against the inclined surface to be stretched and smoothly introduced into the film guiding slit.

However this camera is disadvantageous in that it is difficult to automatically bring the leader into engagement with the film wind-up mechanism if the length of the leader projecting from the cassette body is too long and the leader extends beyond the side edge of the backlid member. In such a case, the leader must be manually cut.

SUMMARY OF THE INVENTION

In view of the foregoing description and observations, the primary object of the present invention is to provide a camera which can be easily loaded with a conventional 35 mm film cassette by simple insertion of the cassette, without need to touch or manipulate the film leader thereof and in which the leader can be automatically cut in response to closure of the backlid in case that the leader is longer than a predetermined length, thereby facilitating automatic engagement of the leader with the film wind-up mechanism.

The camera of the present invention has an openable backlid member and a film chamber member defining a cassette receiving chamber. The cassette receiving chamber is exposed when the backlid member is opened, and comprises a cylindrical portion and a slot portion which substantially conform with the cylindrical body and the tongue portion in shape. Thus the cassette receiving chamber determines the position of the film cassette when it is inserted thereinto and holds the film cassette in place. A guide member extends from the film chamber member to define between the inner surface of the backlid member and itself a film guiding slit aligned with said slot and extending beyond the film aperture of the camera body. The guide member has an inclined surface inclining downward toward the backlid member. When the cassette is inserted into the cassette receiving chamber, the lower edge of the leader abuts against the inclined surface to be stretched and smoothly introduced into the film guiding slit. A film cutter is disposed in the film guiding slit between the film aperture and the film take-up chamber and cuts the leader in response to the closure of the backlid member in case that the leader is so long as to extend beyond the cutter.

BRIEF DESCRIPTION OF THE DRAWINGS

FIG. 1 is a schematic perspective view of a camera in accordance with an embodiment of the present invention, FIG. 2 is a view schematically showing cutter means employed in the camera of FIG. 1, FIG. 3 is a side elevational view of the camera of FIG. 1, FIG. 4 is a fragmentary perspective view of a part of the camera of FIG. 1.

DESCRIPTION OF THE PREFERRED EMBODIMENT

Figure 5:
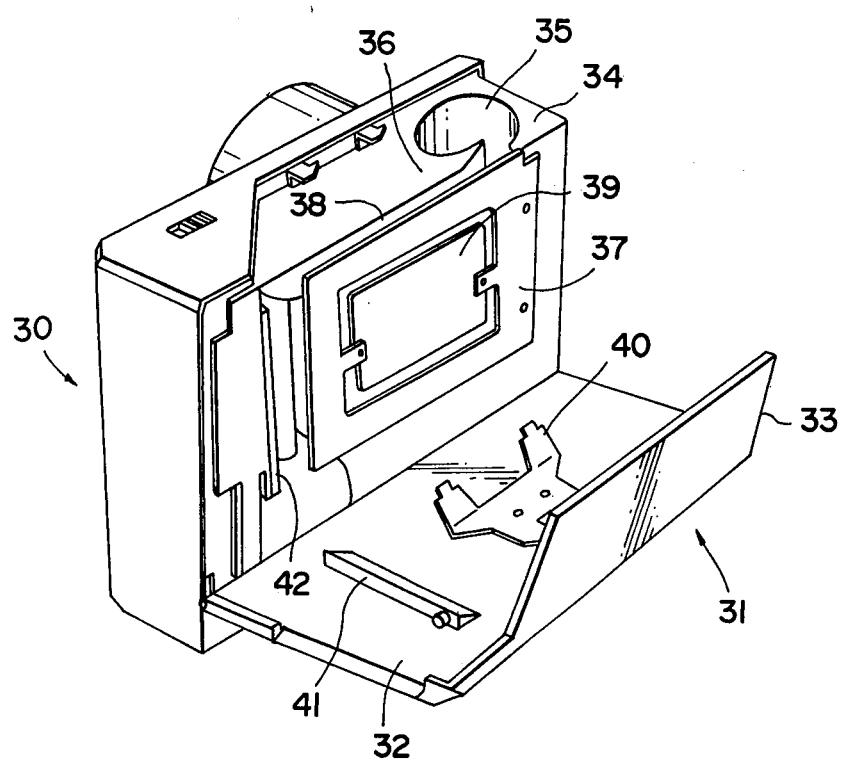
FIG. 5 is a perspective view of a photographic camera in accordance with another embodiment of the present invention with the camera being upside down.

In FIG. 1, there is schematically shown a 35 mm camera in accordance with an embodiment of the present invention together with a 35 mm film cassette 1 to be loaded in the camera.

As is well known and as shown in FIG. 1, the cassette 1 comprises a hollow cylindrical body 2, a film spool 3 mounted in the body 2 along the longitudinal axis thereof and an integrally formed tongue portion 4 extending generally tangentially from the side wall of the body 2. An exit slit (not shown) is formed in the tongue portion 4 and a leader 5 of a 35 mm film wound on the spool 3 in the body 2 projects through the exit slit by a predetermined length determined by the maker of the cassette.

The camera of this embodiment includes a camera body 10 having a backlid member 11 hinged to the rear side of the body 10 at its lower edge so as to swing by a predetermined angle as shown by arrows A and A' about an axis 11a (FIG. 3). It should be noted that the present invention concerns the film loading system and accordingly parts such as a shutter release button, a film wind-up lever and a rewind lever are not shown in the drawings. A film chamber member 12 defining a film chamber 13 for receiving the cassette 1 is mounted on the backlid member 11 so that the film chamber 13 is entirely opened to permit insertion and extraction of the cassette when the backlid member 11 is opened as shown in FIG. 1. The backlid member 11 is normally locked in the closed position by a releasable latch, for example.

Now referring to also FIG. 4, the film chamber 13 opens through a slot 14 formed in the film chamber member 12 near a corner thereof adjacent to the backlid member 11. A guide member 15 extends from the film chamber member 12 toward a film take-up chamber 45 (not shown) in the camera body 10. A film wind-up mechanism such as a wind-up spool is mounted in the film take-up chamber. The film chamber 13 and the film take-up chamber are located on opposite sides of a film aperture (not shown). The guide member 15 extends horizontally from the upper end of the film chamber member 12 on one side of the slot 14 remote from the backlid member 11 and in parallel to the inner surface of the backlid member to define a film guiding slit 16. The film chamber 13 is substantially cylindrical in shape and dimensioned to receive and hold the cassette body 2 in place extending across the film aperture, as seen in FIG. 1. The slot 14 extends tangentially of the film chamber 13 to receive the tongue portion 4 of the cassette 1 when the body 2 of the cassette 1 is inserted into the film chamber 13. The guide member 15 has a longitudinally extending inclined surface 17 which inclines downward toward the inner surface of the backlid member 11. The inclined surface 17 facilitates smooth introduction of the leader 5 into the film guiding slit 16 when the cassette body 2 and the tongue portion 4 are received in the film chamber 13 and the slot 14, respectively. Alternatively, the guide member 15 may be in the form of a round rod.

The diameter of the cylindrical portion of the film chamber 13 is determined so that the cassette 1 cannot be inserted into the film chamber 13 unless the tongue portion 4 thereof is received in the slot 14. Therefore, the cassette 1 cannot be inserted into the film chamber 13 in incorrect or inverted orientation. A peninsular portion (the inner edge portion) 18 of the slot 14 engages with a recess 4a defined between the rear face of the tongue portion 4 and the peripheral surface of the cassette body 2 when the cassette body 1 is inserted into the film chamber 13 as will be described hereinbelow.

When loading the camera of this embodiment with the 35 mm cassette 1, the backlid member 11 is opened as shown in FIG. 1. Then the cassette body 2 is inserted into the film chamber 13 in a position in which the tongue portion 4 is received in the slot 14 and the recess 4a behind the tongue portion 4 is engaged with the peninsular portion or the inner edge portion 18 of the slot 14. When the cassette body 2 is inverted or in an incorrect orientation, the tongue portion 4 abuts against the wall portion of the film chamber 13 to prevent insertion of the cassette body 2 into the chamber 13. Therefore, even those who are not familiar with cameras can easily figure out the proper orientation of the cassette body 2. As the cassette body 2 is moved downward into the film chamber 13, the lower edge of the leader 5 abuts against the upper surface of the guide member 15 as the cassette body 2 is moved downward, and is introduced into the slit 16 between the guide member 15 and the inner surface of the backlid member 11 with the leader 5 being progressively stretched by the inclined surface 17 of the guide member 15.

A fixed cutting blade 20 is mounted between the film aperture and the film take-up chamber. A movable cutting blade 21 cooperating with the fixed cutting blade 20 is mounted on the backlid member 11 by way of a resilient mounting member such as a plate spring 22. If desired, a light shielding member may be provided on the backlid member 11 to prevent light from passing between the blades 20 and 21.

When a cassette having a long leader is inserted into the film chamber 13 and the leader is introduced into the film guiding slit 16 in the manner described above, the leader will be positioned between the fixed cutting blade 20 and the movable cutting blade 21 as shown in FIG. 2. Accordingly when the backlid member 11 is closed the end portion of the leader extending beyond the blades 20 and 21 is automatically severed and falls outside the camera body 10. Thus the leader is cut to a length suitable for automatically bringing the leader into engagement with the film wind-up mechanism in the film take-up chamber.

In order to feed the leader to the film take-up chamber, various well known means such as a sprocket or pinch rollers can be used.

In the above embodiment, the film chamber member is mounted on the backlid member. However, the film chamber member may be mounted on the camera body as shown in FIG. 5. In this embodiment, an L-shaped backlid member 31 comprises a first portion 32 and a second portion 33 integrally extending from the first portion 32 substantially perpendicular thereto. The backlid member 31 is hinged to a camera body 30 at its upper end and is swingable about a rotational axis adjacent to the upper (lower as seen in FIG. 5) face of the camera body 30 to open and close. When the backlid member 31 is closed, the first and second portions 32 and 33 cover the backside and the underside of the camera body 30, respectively. A film chamber member 34 similar to the film chamber member 12 of the embodiment shown in FIG. 1 is disposed in the camera body 30 so that a film chamber 35 formed therein entirely opens from the underside of the camera body 30 when the backlid member 31 is opened. A guide member 36 similar to the guide member 15 of the embodiment shown in FIG. 4 extends from the film chamber member 34. The function and the structure of the film chamber member 34 and the guide member 36 are substantially the same as those of the previous embodiment, and accordingly, these members are not shown in detail in FIG. 5.

A pressure plate supporting member 37 is mounted opposed to the guide member 36 to define therebetween a film guiding slit 38. The pressure plate supporting member 37 has a central opening behind a film aperture (not shown) of the camera body 30 and a film pressure plate 39 is supported in the central opening for a slight movement back and forth. A plate spring 40 is mounted on the inner surface of the backlid member 31. When the backlid member 31 is closed, the film pressure plate 39 is pushed forward by the plate spring 40 to support the film. When loading the camera of this embodiment, the camera body 30 is positioned upside down and the backlid member 31 is opened to expose the film chamber 35. Then the cassette 1 is inserted into the film chamber 35 in a manner similar to that described with respect to FIGS. 1 to 4. When the leader 5 is too long, the leading end portion thereof is severed by a movable cutting blade 41 mounted on the backlid member 31 and a fixed cutting blade 42 fixed on the camera body 30 upon closure of the backlid member 31.

We claim:

1. A photographic camera adapted to be loaded with a film cassette having a cylindrical body portion and a tongue portion extending from the peripheral surface thereof in a generally tangential direction, the leader of the film contained in the cassette body projecting through an exit slit formed in the tongue portion, which camera comprises a camera body having a film aperture, an openable backlid member extending over the film aperture, a film chamber for receiving the film cassette and a film take-up mechanism for winding up the film from the cassette body, the film chamber and the film take-up mechanism being disposed on opposite sides of the film aperture, wherein the improvement comprises a film chamber member defining a film chamber having an opening the shape and the dimensions of which are selected so that the cassette can only be inserted thereinto in a predetermined orientation by movement in its axial direction, thereby holding the inserted cassette in place; a guide member for guiding the leader into the camera body when the cassette is inserted into the film chamber; said guiding member having a film guide slit extending over the film aperture and a film cutter means positioned outside said take-up chamber between the film aperture and the film take-up chamber to cut film which overlies completely the film aperture and resides in said slit, said film chamber member being mounted so that said opening thereof is exposed to permit insertion of the cassette when the backlid member is opened, said film cutter means comprising a first shearing blade mounted on said camera body parallel to the plane of the film in said slit and having a cutting edge extending transversely of the path of travel of the film, and a second, movable shearing blade mounted on said cover with a cutting edge located to be closely adjacent and parallel to the cutting edge of the first shearing blade when the cover is closed, whereby the leading end portion of a film leader extending beyond the film aperture and over said first shearing blade is automatically cut in response to closure of the backlid member, said backlid member is pivotally mounted on said camera body for pivotal movement between open and closed positions on an axis extending in the direction of film feed whereby the pivotal movement of said back lid member moves said second shearing blade relative to said first shearing blade to produce a shearing action between the cutting edges thereof and thereby cut the film when the back lid is closed at a position downstream of the film aperture.

2. A camera as defined in claim 1 wherein said film chamber member is disposed in the camera body so that said opening of the film chamber is exposed from the underside of the camera body when the backlid member is opened.

3. A camera as defined in claim 1 wherein said film chamber member is mounted on the backlid member.

4. A camera as defined in claim 2 or 3 wherein said movable blade is mounted on the backlid member by way of a resilient member.

5. A camera as defined in claim 4 wherein said backlid member is hinged to the camera body at its lower edge.

* * * * *